(12) United States Patent
Prabhu et al.

(10) Patent No.: US 6,407,755 B1
(45) Date of Patent: Jun. 18, 2002

(54) METHOD FOR SELECTIVELY OR AUTOMATICALLY MATCHING THE CHARACTERISTICS OF A DISPLAY TO A LANGUAGE

(75) Inventors: Girish V. Prabhu, Fairport; Su Y. Akyuz, Rochester; Michael E. Miller, Rochester; Dan Harel, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/272,855

(22) Filed: Mar. 19, 1999

(51) Int. Cl.[7] .................................................. G06F 3/14
(52) U.S. Cl. ...................... 345/765; 345/764; 345/835; 345/810
(58) Field of Search ................................ 345/333, 335, 345/339, 348, 349, 145

(56) References Cited

U.S. PATENT DOCUMENTS

| 5,127,748 A | * | 7/1992 | Okimoto et al. ............... 400/70 |
| 5,416,903 A | * | 5/1995 | Malcolm ..................... 345/333 |
| 5,459,488 A | | 10/1995 | Geiser ......................... 345/173 |
| 5,551,055 A | | 8/1996 | Matheny et al. ............. 395/882 |
| 5,678,039 A | | 10/1997 | Hinks et al. ................. 395/604 |
| 5,721,851 A | * | 2/1998 | Cline et al. .................. 345/349 |
| 5,973,694 A | * | 10/1999 | Steele et al. ................. 345/349 |

* cited by examiner

*Primary Examiner*—Raymond J. Bayerl
*Assistant Examiner*—Thomas T. Nguyen
(74) *Attorney, Agent, or Firm*—David M. Woods

(57) ABSTRACT

A method for selectively matching or automatically matching one or more items that is visually observable on a display of electronic devices to a selected language, the method comprises the steps of selecting a language for display on the display; and selectively or automatically matching the language to the one or more visually observable items.

6 Claims, 3 Drawing Sheets

METHOD FOR SELECTIVELY OR AUTOMATICALLY MATCHING THE CHARACTERISTICS OF A DISPLAY TO A LANGUAGE

FIELD OF THE INVENTION

The invention relates generally to the field of graphical user interfaces (GUIs) and, more particularly, to matching the characteristics of a display, such as cultural-sensitive icons and/or cultural-sensitive colors, to a language on the GUIs.

BACKGROUND OF THE INVENTION

Computer systems and the like utilize graphical user interfaces (GUIs) such as a monitor for displaying information. Such computer systems may be programmed to provide a plurality of different languages on the monitor. Typically, the GUI is provided with a default language that may be changed to another language by various well-known means, such as typing in a command and the like.

Although the presently known and utilized method for selecting various languages for display on GUIs is satisfactory, there are drawbacks. Such GUIs, although permitting various languages to be displayed, do not permit the icons and functionality to be altered to match the corresponding language. Presently known and utilized computer systems permit colors to be altered, but the colors are not pre-designed to match colors that are traditionally used together by a particular culture.

Consequently, a need exists for overcoming the above-described drawbacks. More specifically, a need exists for cultural-sensitive color matching, cultural-sensitive icon matching and cultural-sensitive functionality matching.

SUMMARY OF THE INVENTION

The present invention is directed to overcoming one or more of the problems set forth above. Briefly summarized, according to one aspect of the present invention, the invention resides in a method for selectively matching or automatically matching one or more items that is visually observable on a display of electronic devices to a selected language, the method comprising the steps of: (a) selecting a language for display on the display; and (b) selectively or automatically matching the language to the one or more visually observable items.

It is an object of the present invention to provide means for altering icons and functionality on GUIs to a desired preference.

It is an object of the present invention to provide means for automatically altering icons and functionality to match the language of the GUI.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantages of permitting cultural-sensitive icons, cultural-sensitive color matching and cultural-sensitive functionality to be displayed on GUIs. This ultimately provides user-friendly GUIs for users.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
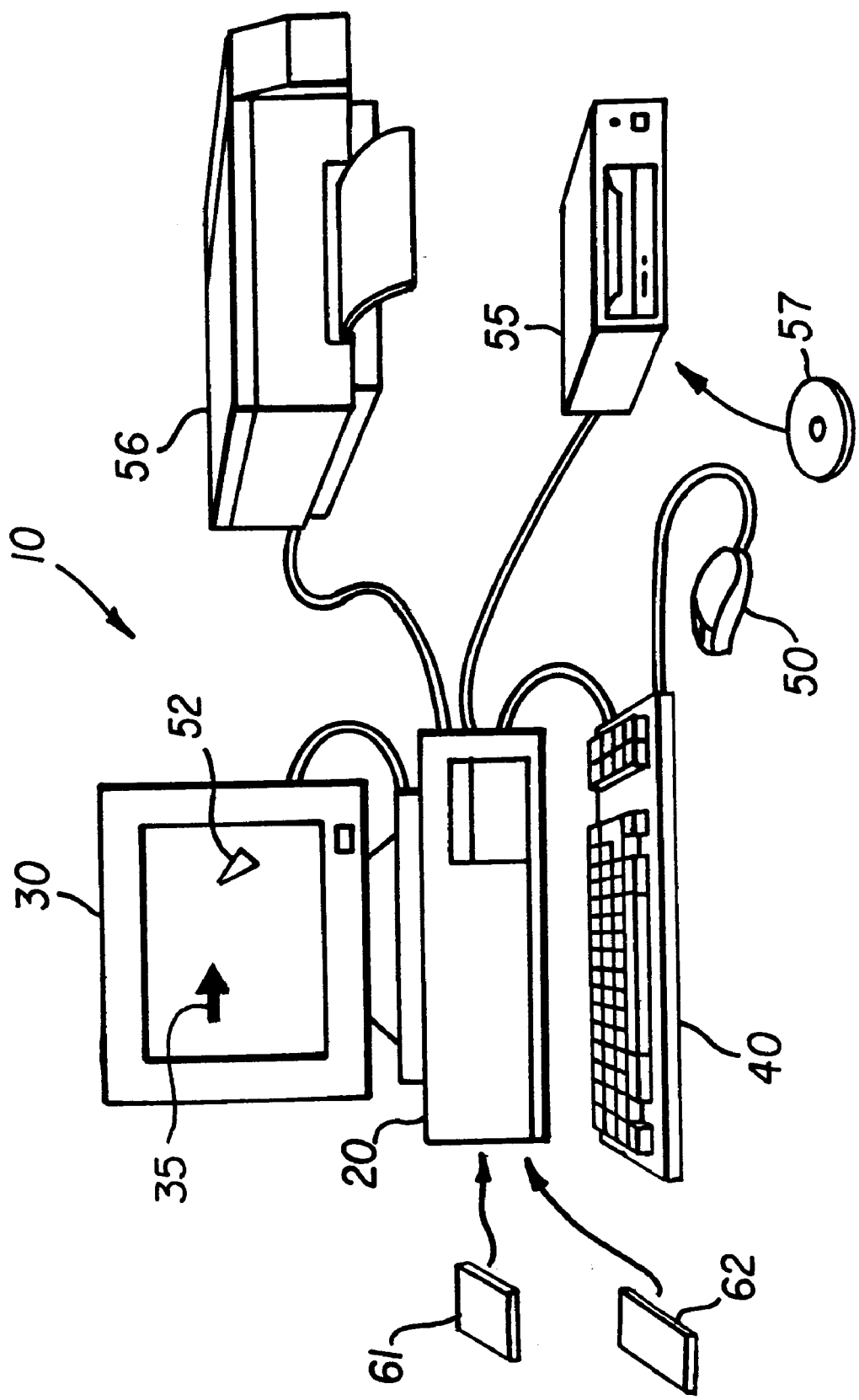
FIG. 1 is a perspective view of a computer-system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit for receiving and processing software programs and for performing other processing functions. A display or graphical-user interface (GUI) 30 is electrically connected to the microprocessor-based unit 20 for displaying user-related information associated with the software, such information being presented to the user by, for example, written text (language), color, functionality and/or icons 35. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disk-read only memory (CD-ROM) 55 is connected to the microprocessor-based unit 20 for receiving software programs, and for providing a means of inputting the software programs and other information to the microprocessor based unit 20 via a compact disk 57, which typically includes a software program. In addition, a floppy disk 61 may also include a software program, and is inserted into the microprocessor-based unit 20 for inputting the software program. Still further, the microprocessor-based unit 20 may be programmed, as is well know in the art, for storing the software program internally. A printer 56 is connected to the microprocessor-based unit 20 for printing a hardcopy of the output of the computer system 10.

Images may also be displayed on the display 30 via a personal computer card (PC card) 62 or, as it was formerly known, a personal computer memory card international association card (PCMCIA card) which contains digitized images electronically embodied in the card 62. The PC card 62 is ultimately inserted into the microprocessor-based unit 20 for permitting visual display of the image on the display 30.

Figure 2:
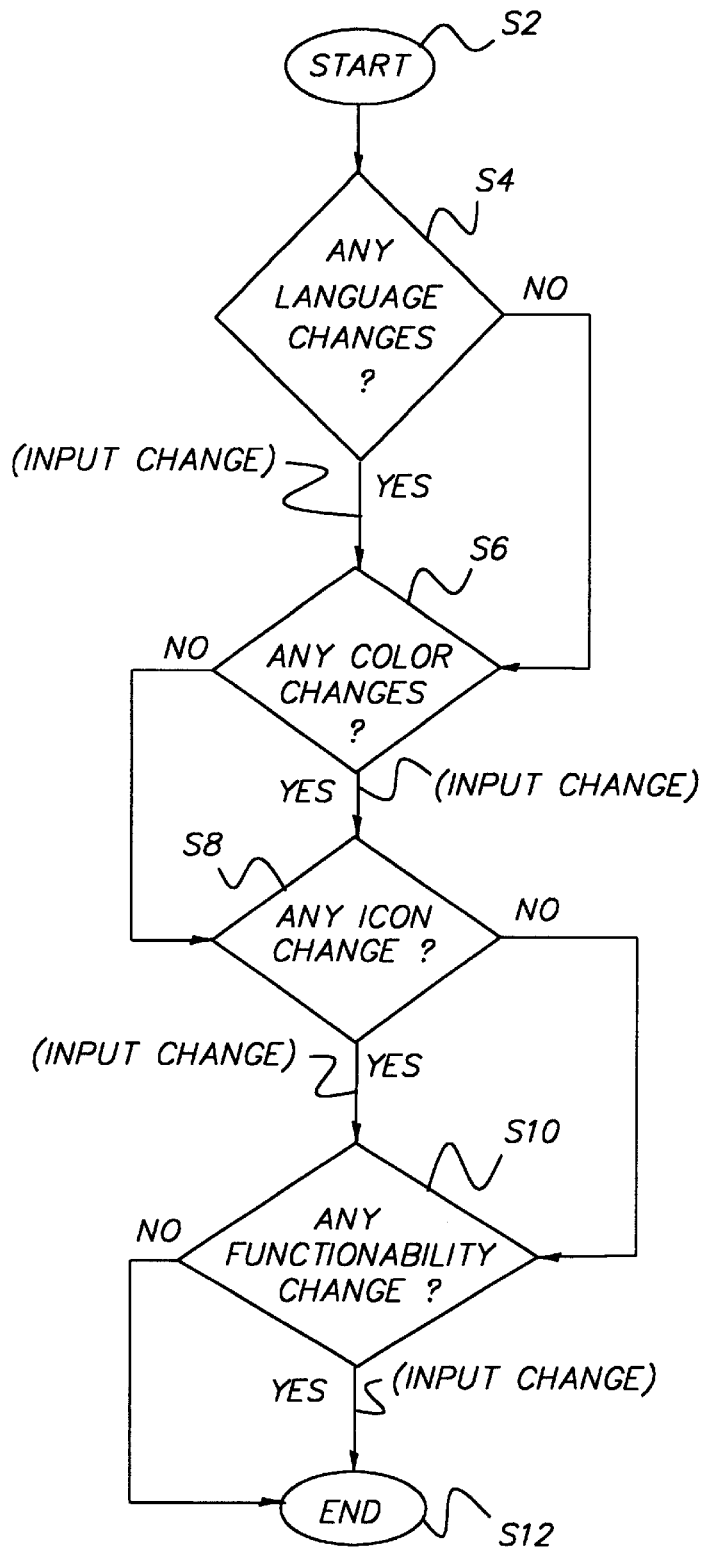
FIG. 2 is a flowchart of a software program of the present invention.

Referring now to FIG. 2, there is illustrated a flowchart representing a software program of the present invention.

The program is initiated S2 and requests S4 any language change displayed on the GUI, such as Chinese, Japanese or English, and the user may input any desired changes to the graphical user interface (GUI) via the selector or the like.

Figure 3:
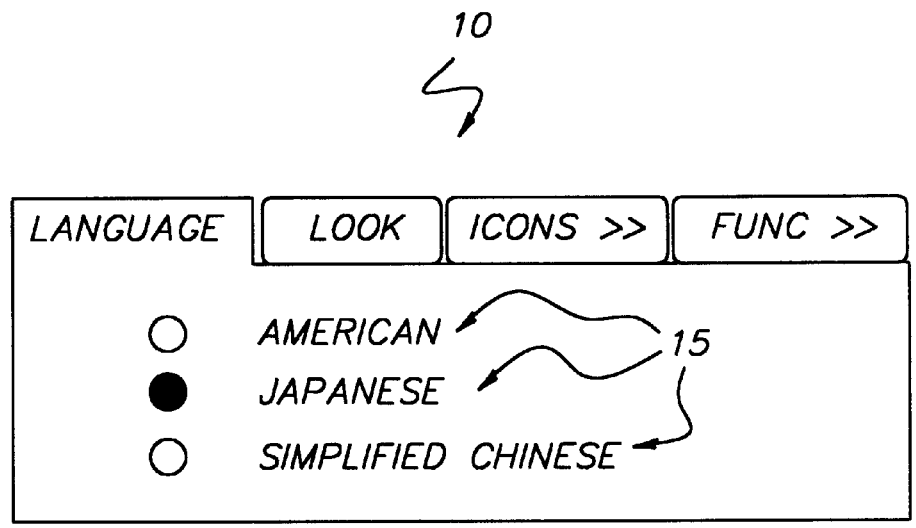
FIG. 3 is an illustration of a menu for display on a GUI for permitting the user to input modifications to the display colors.

The program then prompts S6 the user for cultural-sensitive color changes to the GUI for mating the colors to the particular language, if desired. Referring briefly to FIG. 3, each color selection menu 10 includes colors (not shown) that are mated together in categories 15 so that the mated colors in each category are traditional for the ethnicity that typically uses the particular language. For example, the selection menu 10 may include American colors, Japanese colors, Chinese colors and the like; such combinations are well known to those skilled in the art.

Figure 4:
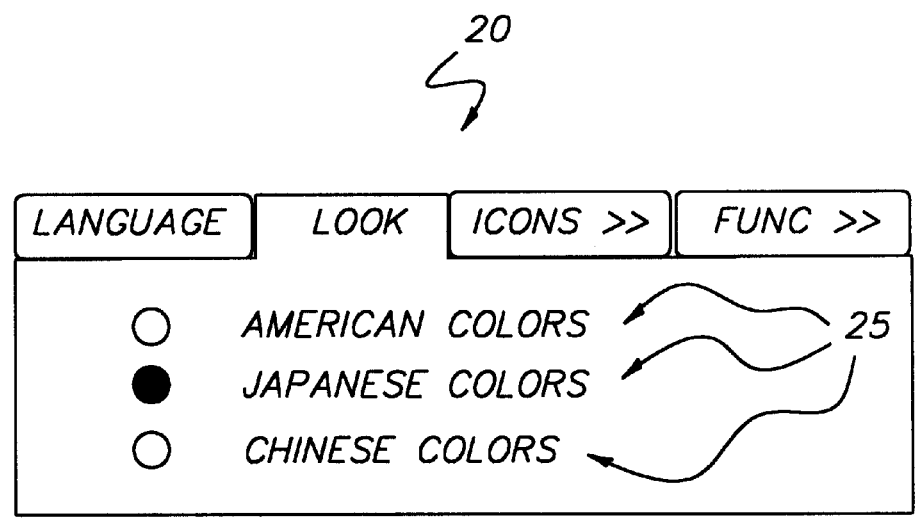
FIG. 4 is an illustration of a menu for display on a GUI for permitting the user to input modifications to the display icons.

Referring back to FIG. 2, the user is then prompted S8 for any cultural-sensitive icon changes for matching the icons that will be displayed on the GUI to the particular language, if desired. Referring briefly to FIG. 4, the selection menu 20 for icons (not shown) may includes a plurality of icons 25 for selection, for example, include selections for U.S. icons, Chinese icons, or Japanese icons. The icons 25 are specifically designed for each particular culture, as those skilled in the art will be able to determine.

Finally, the user is prompted to change the functionality S10 that is available. The computer system stores a plurality of tone scale functions (well known in image processing) that are available according to the functionality chosen. The functionality option includes areas of the world where the user is located, for example India, China, and the like. A tone-scale function is associated with each particular area of the world so that the tone scale functions include the adjustments necessary for the unique flesh tones of that particular area of the world. Tone scale functions are well known in the art and the design to specific flesh tones will be readily achievable by those skilled in the art.

The particular tone scale function chosen may then be applied to images on the GUI for creating a processed image. The processed image may then be used by the computer system when printing hardcopy images to a printer.

It is understood that other types of functionalities may also be included without departing from the scope of the invention.

The program is then exited S12 for returning operation of the computer system to the operating system or another application program.

In an alternative embodiment, the software program is programmed to automatically change the colors, icons, and functionality to match the particular language chosen. Those skilled in the art will readily be able to achieve the modifications necessary to achieve the desired modifications.

The invention has been described with reference to a preferred embodiment. However, it will be appreciated that variations and modifications can be effected by a person of ordinary skill in the art without departing from the scope of the invention.

What is claimed is:

1. A method for matching one or more items that are visually observable on a display of an electronic device to a selected language, said system comprising:

displaying information associated with a selected language, including a menu for displaying a choice of languages and at least two additional menus for displaying an item selected from the group consisting of a choice of colors for the interface, a choice of icons for the interface and a choice of tone scale adjustments that can be made to the interface, wherein the items are specifically defined to be culturally-sensitive in relation to the choice of languages; and prompting the user to advance through the selections offered by the graphical user interface until a culturally and ethnically-appropriate combination of items have been selected by the user to match the selected language.

2. A computer storage medium having instructions stored therein for causing a computer to perform the method of claim 1.

3. A method for matching one or more items that are visually observable on a display of an electronic device to a selected language, said system comprising:

displaying a menu with a choice of languages that are to be used in a graphical user interface;

selecting a language from the menu;

automatically selecting, in response to the selected language, at least two items from the group consisting of a choice of colors for the interface, a choice of icons for the interface and a choice of tone scale adjustments that can be made to the interface, wherein the items are specifically defined to be culturally-sensitive in relation to the choice of languages; and automatically applying the selected items to the interface, thereby obtaining a culturally and ethnically-appropriate combination of items that match the selected language.

4. A computer storage medium having instructions stored therein for causing a computer to perform the method of claim 3.

5. A system for matching one or more items that are visually observable on a display of an electronic device to a selected language, said system comprising:

a graphical user interface for displaying information associated with a selected language, said interface displaying a choice of languages and at least two additional choices of items selected from the group consisting of a choice of colors for the interface, a choice of icons for the interface and a choice of tone scale adjustments that can be made to the interface, wherein the items are specifically defined to be culturally-sensitive in relation to the choice of languages; and means for prompting the user to advance through the choices offered by the graphical user interface until a culturally and ethnically-appropriate combination of items have been selected by the user to match the selected language.

6. A system for matching one or more items that are visually observable on a display of an electronic device to a selected language, said system comprising:

a graphical user interface displaying a choice of languages that may be used in the interface; and means for selecting, in response to the selected language, at least two items from the group consisting of a choice of colors for the interface, a choice of icons for the interface and a choice of tone scale adjustments that can be made to the interface, wherein the items are specifically defined to be culturally-sensitive in relation to the choice of languages, and automatically applying the selected items to the interface, thereby obtaining a culturally and ethnically-appropriate combination of items that match the selected language.

* * * * *